Oct. 22, 1957 C. E. JAKIELSKI 2,810,831

CROSS COUPLING FOR ASTABLE CIRCUITS

Filed March 31, 1955

INVENTOR
C. E. JAKIELSKI
BY W. L. Keefauver
ATTORNEY

United States Patent Office 2,810,831

Patented Oct. 22, 1957

2,810,831

CROSS COUPLING FOR ASTABLE CIRCUITS

Chester E. Jakielski, Whippany, N. J., assignor to Bell Telephone Laboratories, Incorporated, New York, N. Y., a corporation of New York Application March 31, 1955, Serial No. 498,226

3 Claims. (Cl. 250—36)

This invention relates to pulse forming regenerative circuits and more particularly to improved means for accomplishing regeneration in multivibrator circuits.

Pulse forming circuits, such as relaxation oscillators of the multivibrator type, are used for gates, for introducing measured delay, for master oscillators in timers, and for frequency dividers. Multivibrators are either free running or driven depending upon whether or not they are provided with a source of synchronizing potential to control the frequency of oscillation. They are particularly convenient as timing circuits since they characteristically generate rectangular output voltage waveforms. In such circuits, it is desirable that the pulses have substantially vertical leading and trailing edges on the pulses in order that the timing function of the circuit may be accurately performed. Any departure from the rectangular waveform decreases the range of usefulness of the oscillator in timing circuits.

Astable multivibrators usually comprise at least two electronic translating devices and capacitive circuits for cross coupling the output of each translating device to the input of the other translating device. During the source of normal multivibrator operation the coupling circuits accumulate charges which cannot be immediately dissipated upon the transfer of conduction from one translating device to the other. After a transfer has been completed the coupling circuit which is associated with the load resistor of the nonconducting translating device releases its accumulated charge through that load resistor. As long as current flows in the load resistor the potential at the multivibrator output terminal associated with such load resistor cannot reach the full terminal voltage of the supply source. Thus the output voltage pulse has a rounded leading edge.

It is therefore an object of this invention to improve the operation of the multivibrator type of relaxation oscillator. It is another object of the invention to increase the utility of the output voltage of multivibrator circuits.

These objects are accomplished in one embodiment of the invention by providing a transistor, emitter-coupled multivibrator with a capacitor connected between the base of one transistor and ground and with a conventional capacitance cross-coupling circuit from the collector of the same transistor to the base of the other transistor. The multivibrator output voltage is taken from the transistor collector terminal which is not provided with a cross-coupling connection. Thus, the load resistor associated with the multivibrator output terminal is free of the capacitor charge-equalizing currents, and the output voltage will present a rectangular waveform of a high quality not heretofore attainable in transistor multivibrator circuits.

Figure 1:
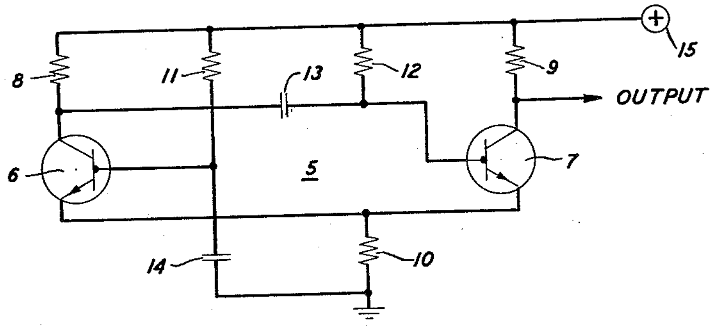
Figure 2:
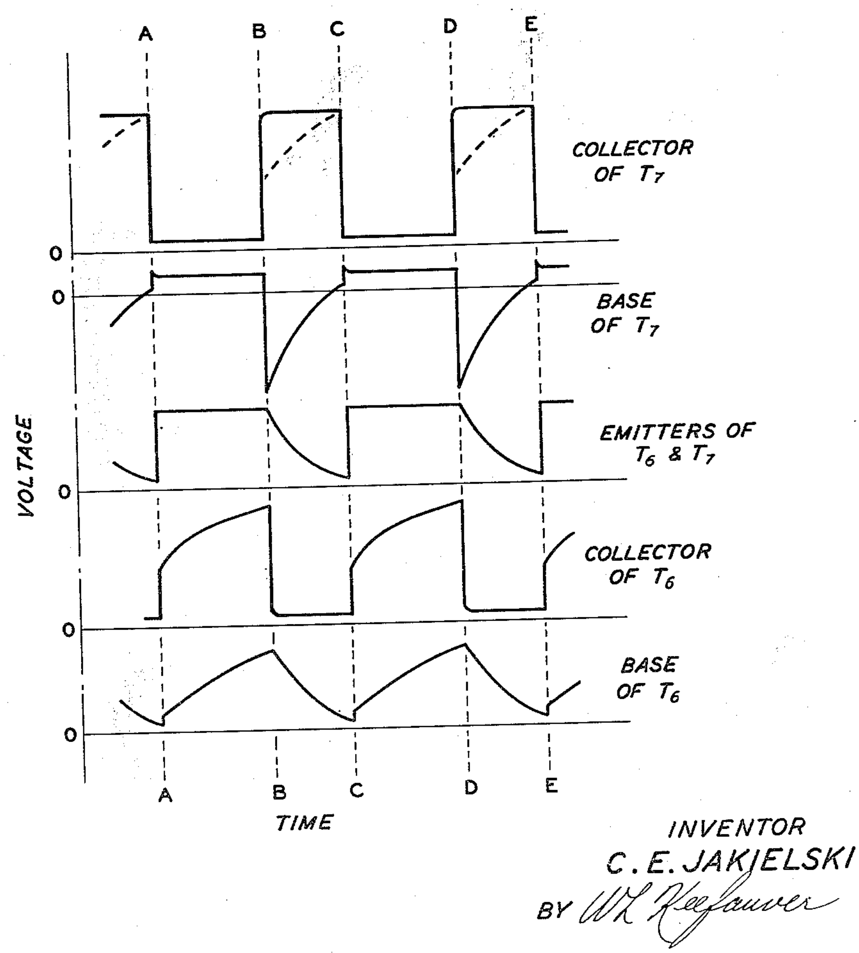

The arrangement and operation of the invention will be apparent from an examination of the following specification and the single sheet of drawings wherein Fig. 1 is a schematic circuit diagram of an astable relaxation oscillator embodying the invention, and Fig. 2 is a series of waveshapes as they might appear on an oscilloscope connected between ground and the transistor terminals indicated by the legends on the drawing. The dotted lines in the waveshape of the voltage at the collector of transistor 7 indicate the shape of that voltage with conventional astable cross-coupling connections.

A relaxation oscillator illustrating the invention is shown in Fig. 1. This circuit is an emitter-coupled, astable, transistor multivibrator 5, the two electronic translating devices of which are transistor switches 6 and 7. The load resistors 8 and 9 are connected to the collector terminals of transistors 6 and 7, respectively. The emitter terminals of transistors 6 and 7 are connected together and to ground through a common current regenerative impedance, resistor 10. The resistors 11 and 12 are connected to the base terminals of transistors 6 and 7, respectively. A first coupling capacitor 13 is connected between the collector of transistor 6 and the base of transistor 7. A second coupling capacitor 14 is connected between the base of transistor 6 and ground. A source 15 of operating potential is schematically represented by a circled plus sign which indicates a source of potential arranged with its positive terminal connected to the circuit of Fig. 1 at the point where the circled plus sign appears and with its negative terminal connected to ground. Source 15 provides bias potentials to transistors 6 and 7 through resistors 8, 9, 10, 11 and 12.

It is believed that the circuit operates as follows. When power is applied to the multivibrator circuit transistor 7 starts to conduct immediately, and its base terminal rises to a positive potential. Transistor 6 cannot start to conduct immediately since its base terminal is held at ground potential until the voltage across capacitor 14 can change.

Referring to Fig. 2 wherein two cycles of multivibrator operation are shown, the times at which conduction is transferred from transistor 6 to transistor 7 are indicated by the dotted lines A, C and E. The times when conduction is transferred from transistor 7 to transistor 6 are indicated by the dotted lines B and D.

In the range between the lines A and B transistor 7 is conducting. The voltage at the collector of transistor 7 is at a constant low value corresponding to the difference between the voltage of source 15 and the potential drop across resistor 9. Current flowing in resistor 12 and the emitter-base circuit of transistor 7 maintains the base of transistor 7 at a relatively constant value representing the difference between voltage of source 15 and the potential drop across resistor 12. Both emitters are held at a positive potential corresponding to the voltage drop in resistor 10 due to the combined collector and base currents from transistor 7.

Still considering the range between lines A and B of Fig. 2, the collector potential of transistor 6 rises instantaneously to the maximum potential of the base of transistor 7. Thereafter the potential of the collector of transistor 6 increases exponentially toward the terminal voltage of source 15 as charge is accumulated on capacitor 13 to match the potential drop across resistor 12. Capacitor 14 and resistor 11 control the time interval that transistor 7 conducts before conduction is transferred to transistor 6. The potential at the base of transistor 6 increases as capacitor 14 charges toward the terminal voltage of source 15.

As long as the potential on the base of transistor 6 is less than the potential on the emitters, transistor 7 continues to conduct. At time B these two potentials become approximately equal, and transistor 6 starts to conduct. The current drawn by transistor 6 through resistor 8 causes the collector terminal voltage to drop abruptly. Since the voltage across capacitor 13 cannot change instantaneously, the decrease in collector voltage of transistor 6 causes a corresponding decrease in base potential at transistor 7 to a large negative value. The current through transistor 7 decreases thereby reducing the current in resistor 10 and lowering the potential of the common emitter connection of multivibrator 5. The latter change results in an increase in the current through resistor 8 and transistor 6 thus further reducing the potential of the collector terminal of transistor 6 and the potential of the base terminal of transistor 7. Once the transfer of conduction has been started it continues regeneratively until transistor 7 is completely cut off and transistor 6 is conducting its maximum current. This change is actually accomplished so rapidly that the potential changes at the collectors of transistors 6 and 7 and at the base of transistor 7 are completed substantially instantaneously.

In the interval between lines B and C of Fig. 2, the potential at the collector of transistor 6 remains essentially constant. The potentials at the emitter and base terminals, however, decrease along similar paths, probably approaching a steady state condition at which the current in resistor 10 is equal to the sum of the currents in resistors 8 and 11. Capacitor 14 discharges toward a potential corresponding to the combined drop across resistor 10 and the internal emitter-base circuit of transistor 6.

Capacitor 13 charges toward a value corresponding to the drop across resistor 8. The charge circuit for capacitor 13 includes resistor 12, resistor 10, and the internal emitter-collector circuit of transistor 6. The potential at the base terminal of transistor 7 becomes approximately equal to the now reduced emitter potential as shown in Fig. 2. This point is reached at time C, and transistor 7 starts to conduct again. The increased current flowing in resistor 10 as a result of conduction in transistor 7 raises the emitter potential toward the potential of the base of transistor 6. The resultant decrease in current in resistor 8 increases the potential at the collector of transistor 6 and further increases the potential at the base of transistor 7. This cumulative switching action continues until transistor 6 has been completely cut off and transistor 7 is conducting its full current.

It is believed that the time required for capacitor 13 to become charged while transistor 6 is conducting is controlled in part by capacitor 14. During the interval when transistor 6 is conducting the charge on capacitor 14 is changing and causing a transient electron current to be supplied to the base of transistor 6. As the charge on capacitor 14 approaches a stable condition with respect to the potentials impressed thereon this electron current decreases. The impedance of the internal emitter-collector circuit of transistor 6 changes, and the impedance change affects the time constant of the charging circuit of capacitor 13. Thus capacitor 14 and capacitor 13 control the time that transistor 6 conducts before conduction is transferred to transistor 7.

It is apparent that the various resistors of the multivibrator circuit must be so designed that the maximum current in transistor 7 is larger than the maximum current in transistor 6. The increase in current in resistor 10 when transistor 7 starts to conduct is necessary to raise the emitter potential to cut off transistor 6.

The following table presents one set of values for the components of the circuit of Fig. 1, and operation of the circuit with these values yielded oscilloscope traces substantially as shown in Fig. 2:

| | | |
|---|---|---|
| Source: | | |
| 15 | volts | 13.5 |
| $R_8$ | ohms | 39,000 |
| $R_9$ | do | 4,500 |
| $R_{10}$ | do | 340 |
| $R_{11}$ | do | 470,000 |
| $R_{12}$ | do | 150,000 |
| $C_{13}$ | micromicrofarads | 5,700 |
| $C_{14}$ | do | 2,200 |

Repetition rate: Approximately 10,000 C. P. S.

While the present invention has been illustrated through the medium of a particular circuit arrangement, many equivalent arrangements will be apparent to those skilled in the art and are included within the spirit and scope of the invention. Thus, for example, it is evident that other types of transistors such as either N–P–N or P–N–P transistors might be employed, and that the time constants of the various parts of the circuit could be changed to change the duration of the output pulses. The component values listed above are merely illustrative and are not in any way indicative of a limitation on the values that may be used.

What is claimed is:

1. In an astable transistor multivibrator including a first and a second transistor each having a base terminal, an emitter terminal, and a collector terminal, and common means for coupling said emitter terminals to ground, the improvement in regenerative coupling means between said transistors comprising capacitive means coupling the base of said first transistor to the collector of said second transistor, a source of voltage having a positive terminal and a ground potential terminal, a capacitor connected between the base of said second transistor and ground, and circuit means connecting said terminals of said source to said terminals of said first and second transistors, said circuit means including means causing the maximum current in said first transistor to be greater than the maximum current in said second transistor.

2. In an astable multivibrator a first and a second electronic switch, a source of potential, means connecting said first and second switches to said source so that the maximum current in said second switch is greater than the maximum current in said first switch, a first capacitor, means connected to said source and including said first capacitor for biasing said second switch open in response to the closing of said first switch and holding said second switch open for a predetermined time thereafter, a second capacitor, a resistor, means including said second capacitor and said resistor for connecting said first and second switches to said source to hold said first switch open a predetermined time after the closing of said second switch, a current regenerative resistor, and means including said current regenerative resistor and connecting said first and second switches to said source for biasing said first switch open in response to the closing of said second switch.

3. In an astable transistor multivibrator including a first and a second transistor each having a base terminal, an emitter terminal, and a collector terminal, a first capacitor, a first conduction transfer controlling means including said first capacitor coupling the base of said first transistor to the collector of said second transistor, a second capacitor, a first resistor, current regenerative means connecting the emitter terminals of both of said transistors through said first resistor to ground, a source of direct current potential having a positive terminal and a terminal at ground potential, a second resistor, a third resistor, means including said second and third resistors and said first capacitor connecting the collector terminal of said second transistor to the positive terminal of said source, a fourth resistor, a second conduction transfer controlling means including said fourth resistor and said second capacitor for connecting the base terminal of said second transistor to the positive terminal of said source and ground respectively, a fifth resistor, nonreactive means including said fifth resistor and said potential source for deriving an output voltage from said multivibrator at the collector terminal of said first transistor substantially independently of transient currents in said transfer means, the impedance of said fifth resistor being smaller than the impedance of said second resistor whereby the maximum current in said first transistor is larger than the maximum current in said second transistor.

References Cited in the file of this patent

Article, "Transistors Use Emitter Coupled Feedback," by Alexander; pages 188, 190, and 192 of "Electronics" for December 1954.